(12) United States Patent
Sasaki

(10) Patent No.: US 8,488,226 B2
(45) Date of Patent: Jul. 16, 2013

(54) OPTICAL APPARATUS

(75) Inventor: Kunihiko Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 217 days.

(21) Appl. No.: 13/159,521

(22) Filed: Jun. 14, 2011

(65) Prior Publication Data

US 2011/0310457 A1    Dec. 22, 2011

(30) Foreign Application Priority Data

Jun. 17, 2010 (JP) .................................. 2010-138620

(51) Int. Cl.
*G02B 26/02* (2006.01)

(52) U.S. Cl.
USPC ............ 359/230; 359/234; 396/493; 396/510

(58) Field of Classification Search
USPC .......... 359/227, 230, 234–236; 396/458–461, 396/493, 495–501, 510
See application file for complete search history.

(56) References Cited

U.S. PATENT DOCUMENTS

| | | | | |
|---|---|---|---|---|
| 7,379,665 B2 * | 5/2008 | Wada | ............................. | 396/260 |
| 7,955,007 B2 * | 6/2011 | Uehara | .......................... | 396/448 |
| 2008/0175584 A1 * | 7/2008 | Ohkuma | ........................ | 396/458 |

FOREIGN PATENT DOCUMENTS

| | | |
|---|---|---|
| JP | 08-265620 A | 10/1996 |
| JP | 3535603 B2 | 3/2004 |

* cited by examiner

*Primary Examiner* — James Phan
(74) *Attorney, Agent, or Firm* — Rossi, Kimms & McDowell LLP

(57) ABSTRACT

The optical apparatus includes plural stop blades, an opening/closing mechanism moving the stop blades in opening and closing directions, an actuator driving the opening/closing mechanism, and a controller controlling drive of the actuator. The controller calculates, when moving the stop blades from a first position to a second position in video capturing, a control driving amount of the actuator that is a sum of a target driving amount corresponding to a moving amount of the stop blades from the first position to the second position and a driving correction amount that varies depending on a position and a moving direction of the aperture blades, the position being at least one of the first and second positions. The controller controls the drive of the actuator based on the control driving amount.

4 Claims, 3 Drawing Sheets

OPTICAL APPARATUS

BACKGROUND OF THE INVENTION

1. Field of the Invention

The present invention relates to an optical apparatus equipped with an aperture stop unit (light amount adjusting unit), such as a lens apparatus and an image pickup apparatus.

2. Description of the Related Art

Light amount adjusting units, generally called aperture stop units, move plural stop blades in opening and closing directions by an actuator such as a stepping motor to change the size of a stop aperture formed by the stop blades so as to increase and decrease an amount of light passing through the stop aperture.

When performing video capturing with operation of such an aperture stop unit, it is necessary to always keep smooth movement of the stop blades in response to variations of luminance of a captured object so as to ensure high aperture value accuracy. However, such smooth movement of the stop blades may be prevented due to backlash included in an opening/closing mechanism transmitting a driving force of the actuator to the stop blades to move them in the opening and closing directions, and due to a cogging torque of the stepping motor.

Japanese Patent No. 3535603 discloses an optical apparatus that has a lens drive mechanism transmitting a driving force of an actuator to a lens and controls the actuator so as to move the lens by a sum of a normal movement amount of the lens and an additional movement amount so as to avoid deterioration of focusing accuracy due to backlash in the lens driving mechanism. Also in the aperture stop unit, controlling the actuator so as to move the stop blades by a sum of a normal movement amount thereof and such an additional movement can reduce influences of the backlash in the opening/closing mechanism and the cogging torque of the stepping motor, which enables stop blade drive capable of ensuring high aperture value accuracy.

However, in the aperture stop unit, overlap of the stop blades and warpage of each stop blade cause sliding resistance, and the sliding resistance varies depending on a position of the stop blades (that is, depending on an aperture value) and a moving direction thereof. For example, the sliding resistance caused by the warpage of the stop blade increases when the stop blades are moved from a small aperture state (narrowed state) toward an opening direction. Thus, it is necessary for the aperture stop unit to consider not only the backlash of the opening/closing mechanism and the cogging torque of the stepping motor, but also the position and moving direction of the stop blades.

In this respect, the optical apparatus disclosed in Japanese Patent No. 3535603 employs a fixed additional movement amount for avoiding the deterioration of focusing accuracy due to the backlash in the lens driving mechanism regardless of the position of the lens. Therefore, it is difficult in the aperture stop unit to keep the smooth movement of the stop blades only by addition of such an additional movement amount.

SUMMARY OF THE INVENTION

The present invention provides an optical apparatus capable of keeping smooth movement of stop blades to ensure high aperture value accuracy in video capturing.

The present invention provides as an aspect thereof an optical apparatus including plural stop blades, an opening/closing mechanism configured to move the stop blades in opening and closing directions, an actuator configured to drive the opening/closing mechanism, and a controller configured to control drive of the actuator. The controller is configured to calculate, when moving the stop blades from a first position to a second position in video capturing, a control driving amount of the actuator that is a sum of a target driving amount corresponding to a moving amount of the stop blades from the first position to the second position and a driving correction amount that varies depending on a position and a moving direction of the aperture blades, the position being at least one of the first and second positions, and Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 2:
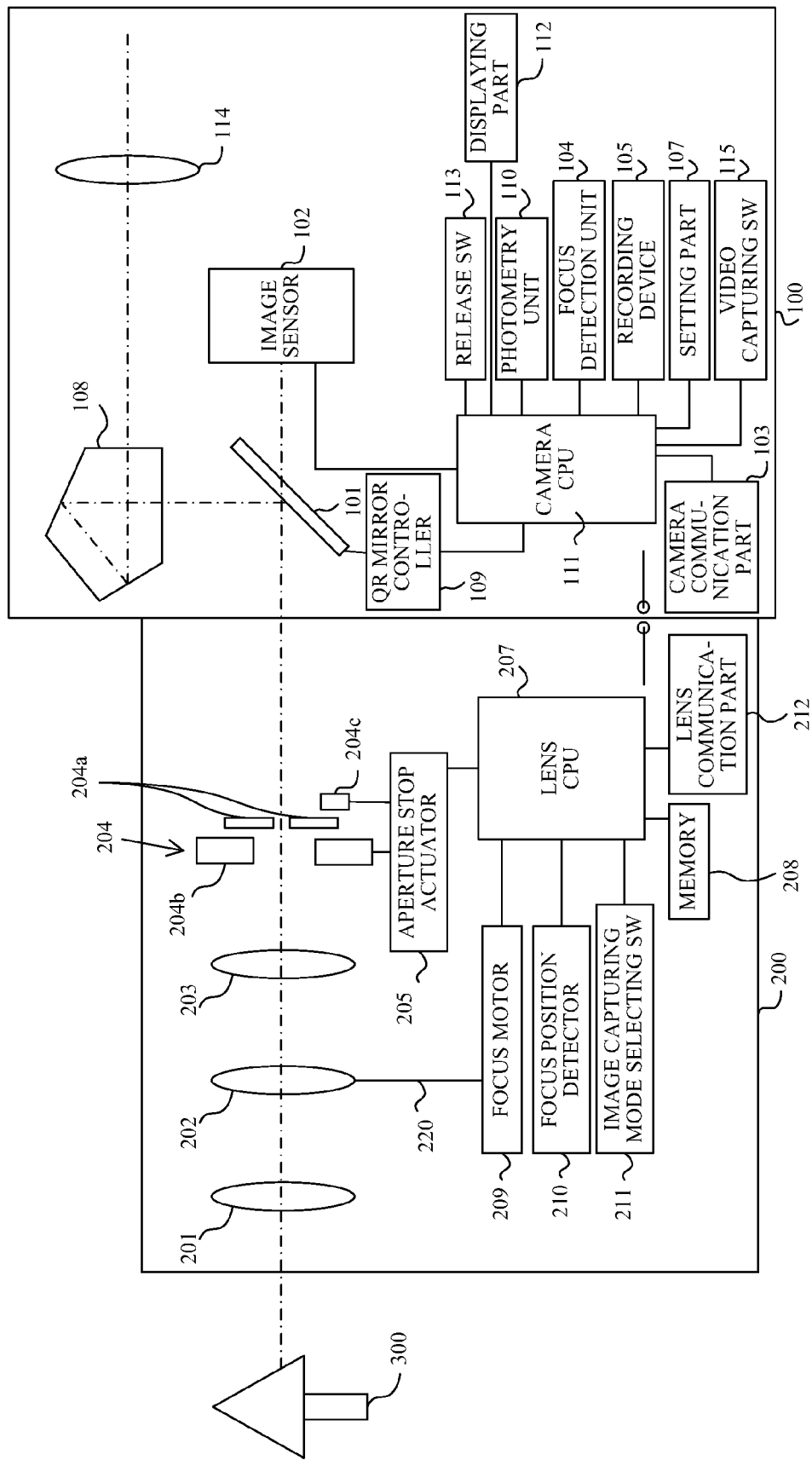
FIG. 2 is a block diagram showing the configuration of the camera system of the embodiment.

FIG. 2 shows the configuration of a lens interchangeable single-lens reflex camera system as an optical apparatus (or an image pickup apparatus) that is an embodiment of the present invention. Although this embodiment will describe the entire camera system, as the optical apparatus, including an interchangeable lens and a camera body, only an interchangeable lens equipped with an aperture stop unit may be regarded as the optical apparatus. Moreover, although this embodiment will describe the lens interchangeable single-lens reflex camera system, alternative embodiments of the present invention include a lens-integrated camera (optical apparatus or image pickup apparatus).

In FIG. 2, reference numeral 100 denotes the camera body, and reference numeral 200 denotes the interchangeable lens that is detachably attached to the camera body 100. The camera body 100 and the interchangeable lens 200 constitute the camera system.

In the interchangeable lens 200, reference numeral 201 denotes a first lens unit, 202 a focus lens unit, 203 a magnification-varying lens unit, and 204 an aperture stop unit. These lens units 201 to 203 and the aperture stop unit 204 constitute an image taking optical system.

The aperture stop unit 204 includes plural stop blades 204a, an opening/closing mechanism that moves the stop blades 204a in opening and closing directions and an aperture stop actuator 205 that drives the opening/closing mechanism 204b to move the stop blades 204a. The aperture stop unit 204 is a so-called iris aperture stop in which the plural stop blades 204a partially overlap each other to form a stop aperture on an optical axis. A size of the stop aperture (stop aperture diameter), that is, an aperture value (F-number) is increased and decreased according to a position of the aperture blades 204a (hereinafter also referred to as an "aperture stop position") in the opening and closing directions. An overlap amount of the aperture blades 204a is also changed according to the aperture stop position.

The aperture stop actuator 205 is constituted by a stepping motor, and drive thereof is controlled by a lens CPU 207 as a controller, which will be described later. In addition, the aperture stop unit 204 is provided with an aperture stop position detector 204c that detects the position of the stop blades 204a (that is, the aperture stop position) in the opening and closing directions.

Although this embodiment uses the aperture stop position detector 204c in consideration of unexpected occurrences such as receiving impact, open control of the stepping motor by pulse counting may be employed.

Reference numeral 210 denotes a focus position detector that detects a position of the focus lens unit 202.

The lens CPU 207 sends and receives various information with a camera CPU 111 through a lens communication part 212 and a camera communication part 103, and governs control of the entire operations of the interchangeable lens 200 together with the camera CPU 111.

A focus motor 209 is constituted by a stepping motor, a vibration type motor or the like, and moves the focus lens unit 202 through a focus driving mechanism 220. The lens CPU 207 controls drive (a driving direction and a driving amount) of the focus motor 209. Specifically, the lens CPU 207 changes a polarity of a focus driving signal that is applied to the focus motor 209 to control the driving direction thereof, and increases and decreases the number of pulses of the focus driving signal to control the driving amount (rotation amount) of the focus motor 209. Thus, the lens CPU 207 controls a moving direction and a moving amount (that is, a position) of the focus lens unit 202. The lens CPU 207 refers to focus position information from the focus position detector 210.

Moreover, the lens CPU 207 controls the drive (a driving direction and a driving amount) of the aperture stop actuator 205. Specifically, the lens CPU 207 changes a polarity of a aperture stop driving signal that is applied to the aperture stop actuator 205 to control the driving direction thereof, and increases and decreases the number of pulses of the aperture stop driving signal to control the driving amount of the aperture stop actuator 205. Thus, the lens CPU 207 controls a moving direction and a moving amount (that is, a position) of the stop blades 204a. The lens CPU 207 refers to aperture stop position information from the aperture stop position detector 204c.

Reference numeral 211 denotes an image capturing mode selecting switch that is operated by a user to select (switch) an image capturing mode between a still image capturing mode and a video (moving image) capturing mode. Although the image capturing mode selecting switch 211 is provided on the interchangeable lens 200 in this embodiment, it may be provided on the camera body 100.

Reference numeral 208 denotes a memory that is constituted by a ROM or the like and stores (memorizes) data of driving correction amounts (focus driving correction amounts and aperture stop driving correction amounts) provided for the focus lens unit 202 and the aperture stop unit 204. The focus driving correction amounts and the aperture stop driving correction amounts will be described later. The lens CPU 207 can retrieve the data of the driving correction amounts stored in the memory 208 as needed.

Light (object light) from an object 300 passes through the image taking optical system in the interchangeable lens 200 to enter the camera body 100. In the camera body 100, the object light forms an object image on an image sensor (image pickup element) 102 in a state where a quick return mirror 101 is retracted out of an optical path. The image sensor 102 is constituted by a photoelectric conversion element such as a CCD sensor and a CMOS sensor, and photoelectrically converts the object image.

Moreover, in a state where the quick return mirror 101 is disposed in the optical path, the object light is reflected by the quick return mirror 101 to a pentaprism 108. The object light reflected by the pentaprism 108 passes through a viewfinder optical system 114 to be introduced to a user's eye. Thus, the user can observe the object image.

Reference numeral 109 denotes a quick return mirror controller that controls up and down operations of the quick return mirror 101 in response to a control signal from the camera CPU 111. Reference numeral 110 denotes a photometry unit that calculates luminance of the object 300 from an output signal (image capturing signal) of the image sensor 102 or from a video signal produced by an image processor described later and sends the calculation result as photometry information to the camera CPU 111.

Reference numeral 104 denotes a focus detection unit that detects, in the still image capturing mode, a focus state of the image taking optical system by a phase difference detection method using the object light reflected by a sub-mirror (not shown) disposed behind the quick return mirror 101. And, the focus detection unit 104 sends focus information showing the focus state to the camera CPU 111. The camera CPU 111 controls the drive of the focus motor 209 to move the focus lens unit 202 to an in-focus position. Auto focus is thus performed in the still image capturing mode, thereby providing an in-focus state of the image taking optical system.

Moreover, the camera CPU 111 produces, in the video capturing mode, contrast information showing a contrast state of a video image, from the video signal produced by the image processor. And, the camera CPU 111 controls the drive of the focus motor 209 to move the focus lens unit 202 to an in-focus position. Auto focus is thus performed in the video capturing mode, thereby providing an in-focus state of the image taking optical system.

In addition, in the still image capturing mode, the camera CPU 111 calculates on the basis of the photometry information the aperture value to be set for the aperture stop unit 204 and an operation speed (shutter speed) of a shutter (not shown) that controls an exposure amount of the image sensor 102.

Reference numeral 113 denotes a release switch that outputs an SW1 signal in response to a user's half-press operation (SW1 ON) and outputs an SW2 signal in response to a user's full-press operation (SW2 ON). The camera CPU 111 starts, in response to input of the SW1 signal, a still image capturing preparing operation such as photometry and auto focus, and starts, in response to input of the SW2 signal, a still image capturing operation.

Reference numeral 115 denotes a video capturing switch that alternately outputs a video capturing start signal and a video capturing stop signal in response to each user's operation. The camera CPU 111 starts, in response to input of the video capturing start signal, a video capturing operation, and ends it in response to input of the video capturing stop signal. Although the video capturing switch 115 is separately provided from the release switch 113, the release switch 113 may double as the video capturing switch 115.

The image processor (not shown) amplifies the image capturing signal output from the image sensor 102 and performs thereon various image processing to produce the video signal as a digital signal. The video signal is input to the camera CPU 111. The camera CPU 111 produces a recording still image, a displaying video image and a recording video image by using the video signal. The displaying video image is displayed as an electronic viewfinder image in a displaying part 112 including a display element such as an LCD panel. The recording still image and the recording video image are recorded at a recording device 105 in a recording medium such as a semiconductor memory.

Figure 1:
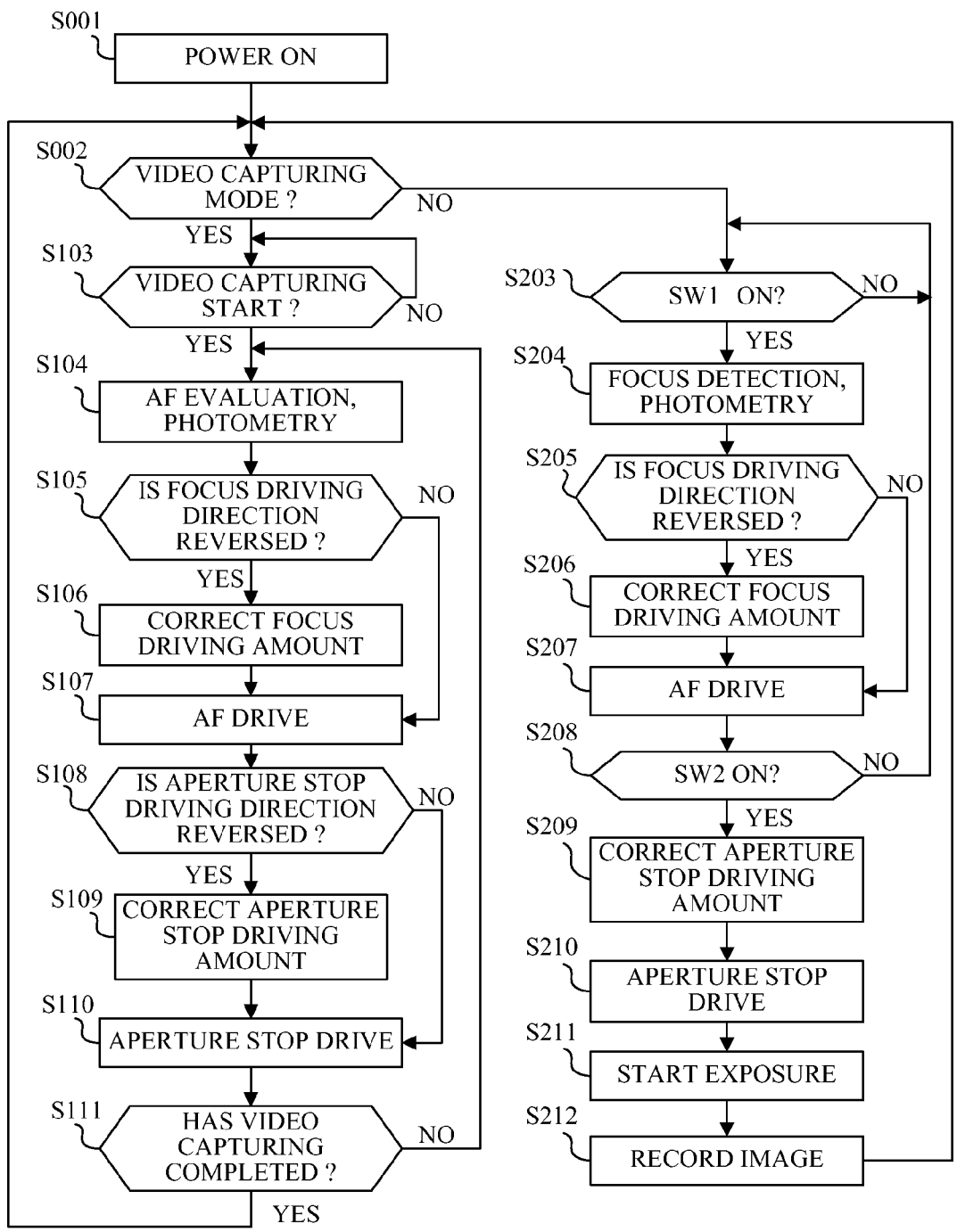
FIG. 1 is a flowchart showing operations of a camera system that is an embodiment of the present invention.

Next, description will be made of operations of the camera system thus configured with reference to a flowchart shown in FIG. 1.

At step S001, the camera CPU 111 is activated in response to power-on of the camera body 100, and the lens CPU 207 is also activated in response to power supply from the interchangeable lens 200. The camera CPU 111 and the lens CPU 207 start communication with each other.

Next at step S002, the camera CPU 111 determines whether the image capturing mode currently set through the image capturing mode selecting switch 211 is the video capturing mode or the still image capturing mode. If the current image capturing mode is the video capturing mode, the camera CPU 111 proceeds to step S103, and if it is the still image capturing mode, the camera CPU 111 proceeds to step S203.

At step S103, the camera CPU 111 determines whether or not the video capturing start signal has been output from the video capturing switch 115. If the video capturing start signal has been output, the camera CPU 111 proceeds to step S104.

At step S104, the camera CPU 111 causes the quick return mirror 101 to perform the up operation and causes the shutter to fully open. Then, the camera CPU 111 causes the image sensor 102 to start photoelectric conversion, and causes the image processor and the recording device 105 to produce and record the video signal. Moreover, the camera CPU 111 performs AF evaluation on the basis of the contrast information produced from the video signal to decide a direction (focus driving direction) in which and an amount (target focus driving amount) by which the focus lens unit 202 is to be moved. Furthermore, the camera CPU 111 calculates a target aperture value that is the aperture value to which the aperture stop unit 204 is to be set, on the basis of the photometry information from the photometry unit 110. Then, the camera CPU 111 sends information on the decided focus driving direction, target focus driving amount and target aperture value to the lens CPU 207.

Next at step S105, the lens CPU 207 compares the focus driving direction (current focus driving direction) received from the camera CPU 111 at step S104 with a focus driving direction (previous focus driving direction) in a previous drive of the focus lens unit 202 which has been stored as focus drive history information, and determines whether the current focus driving direction is reverse to or same as the previous focus driving direction, that is, whether or not the focus drive direction is reversed. If the focus drive direction is not reversed, the lens CPU 207 proceeds to step S107, and if it is reversed, the lens CPU 207 proceeds to step S106.

At step S106, the lens CPU 207 calculates a corrected focus driving amount as a focus control driving amount by adding the focus driving correction amount (pulse number) stored in the memory 208 to the target focus driving amount (pulse number) received from the camera CPU 111 at step S104. The focus driving correction amount is pre-decided depending on an amount of backlash (reversal backlash) caused due to reversal of the focus driving direction in the focus driving mechanism 220. The focus driving correction amount is fixed (constant) regardless of the position of the focus lens unit 202.

Next at step S107, the lens CPU 207 produces the focus driving signal that has a pulse number corresponding to the corrected focus driving amount and causes the focus motor 209 to rotate in a rotation direction corresponding to the focus driving direction. The focus motor 209 receiving the focus driving signal rotates in the rotation direction corresponding to the focus driving direction by a rotation amount corresponding to the above pulse number. Thereby, the focus lens unit 202 is accurately moved to a position corresponding to the target focus driving amount, that is, an in-focus position even though the focus driving mechanism 220 includes the reversal backlash.

Then at step S108, the lens CPU 207 compares the target aperture value received from the camera CPU 111 at step S104, a current aperture value and a previous aperture value with each other, the current and previous aperture values being stored as aperture stop drive history information in the memory 208. And, the lens CPU 207 determines whether or not a moving direction of the stop blades 204*a* from the current aperture value (first position) to the target aperture value (second position) is reverse to or same as a moving direction of the stop blades 204*a* from the previous aperture value to the current aperture value.

In other words, the lens CPU 207 determines whether or not the current moving direction of the stop blades 204*a* is reversed with respect to the previous moving direction thereof. If the current moving direction is not reversed with respect to the previous moving direction, the lens CPU 207 proceeds to step S110, and if it is reversed with respect to the previous moving direction, the lens CPU 207 proceeds to step S109. The moving direction of the stop blades 204*a* is hereinafter referred to as an "aperture stop driving direction".

At step S109, the lens CPU 207 calculates a target aperture stop driving amount (pulse number) that is a target driving amount of the aperture stop actuator 205 originally necessary for moving the stop blades 204*a* by a driving amount (moving amount) corresponding to a difference between the target aperture value and the current aperture value. And, the lens CPU 207 retrieves, from the data of the aperture stop driving correction amount stored in the memory 208, one aperture stop driving correction amount for the current aperture stop driving direction and the aperture stop position corresponding to the current aperture value, and adds the retrieved aperture stop driving correction amount to the target aperture stop driving amount to calculate, as the sum of them, the corrected aperture stop driving amount.

Figure 3:
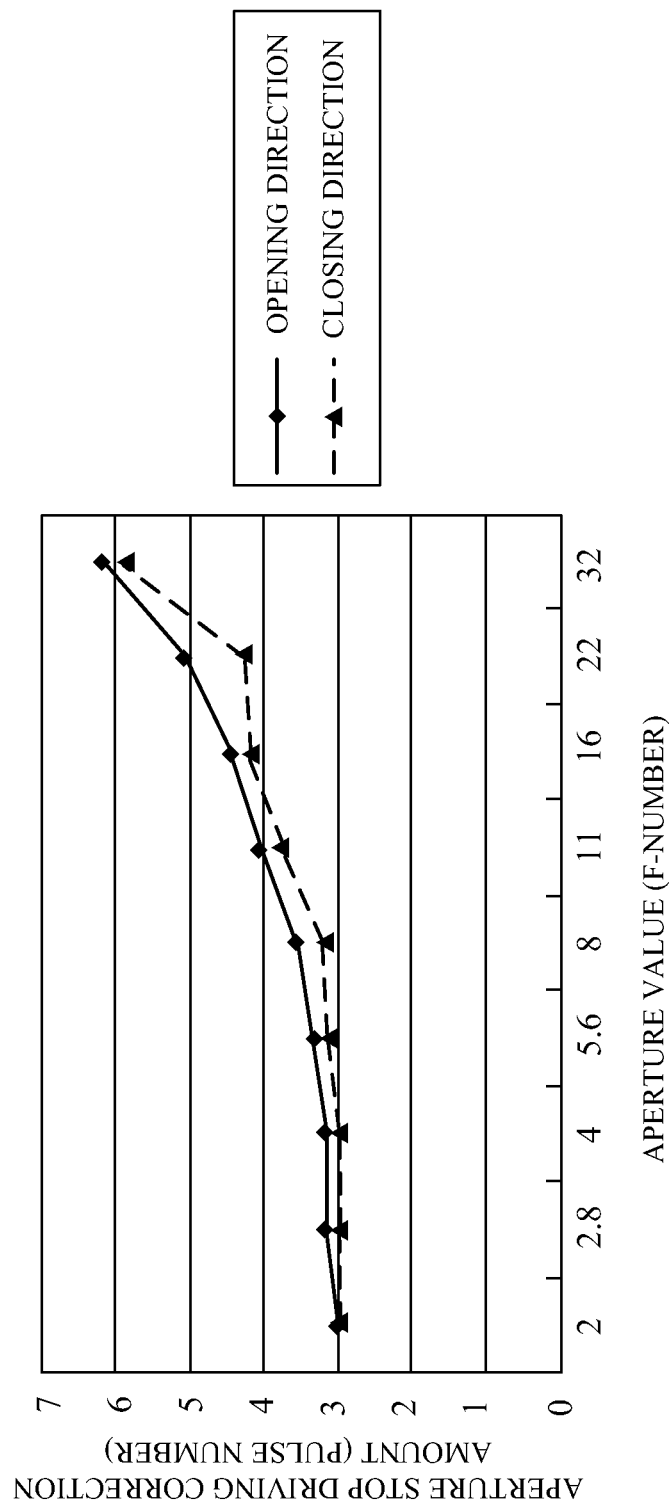
FIG. 3 shows aperture stop driving correction amounts for respective aperture values in the embodiment.

FIG. 3 shows the aperture stop driving correction amounts for the respective aperture stop driving directions and the respective aperture values (F-numbers). The positional accuracy of the stop blades 204*a* in the aperture stop unit 204 is decreased due to the reversal backlash of the opening/closing mechanism 204*b* and a cogging torque of the aperture stop actuator (stepping motor) 205, as well as in the focus driving mechanism 220. Moreover, in the aperture stop unit 204, the positional accuracy of the stop blades 204*a* is also decreased due to sliding resistance caused by overlap of the stop blades 204*a* and warpage of each stop blade 204*a*. In particular, the sliding resistance varies depending on the aperture stop driving direction and the aperture stop position. Therefore, as shown in FIG. 3, this embodiment sets the aperture stop driving correction amount as a value changing depending on the current aperture stop position (current aperture value) and the current aperture stop driving direction (opening or closing direction).

The sliding resistance caused due to the warpage of the stop blade 204*a* increases, particularly when the stop blades 204*a* are moved from a small aperture state toward the opening direction. Therefore, as shown in FIG. 3, the aperture stop driving correction amount for the opening direction is set larger than that for the closing (narrowing) direction. Moreover, for both the opening and closing directions, the aperture stop driving correction amounts are set so as to increase as the aperture value becomes higher (that is, as the size of the stop aperture becomes smaller).

The reversal backlash of the opening/closing mechanism 204b, the cogging torque of the aperture stop actuator 205 and the sliding resistance between the stop blades 204a are varied depending on accuracy of parts and assembly of the aperture stop unit 204. Therefore, it is desirable to measure the aperture stop driving correction amounts to be set for the respective aperture stop driving directions and the respective aperture stop positions and store them in the memory 208 before the interchangeable lens 200 is shipped from its factory.

FIG. 3 shows an example of the aperture stop driving correction amounts, and therefore other aperture stop driving correction amounts than those shown in FIG. 3 may be employed as long as they change depending on the aperture stop position and the aperture stop driving direction. Moreover, it is not necessarily needed that all the aperture stop driving correction amounts be mutually different.

Moreover, this embodiment sets the aperture stop driving correction amount as a value changing depending on the first position that is the current aperture stop position. However, the aperture stop driving correction amount may be set as a value changing depending on the second position that is the target aperture stop position. In other words, the aperture stop driving correction amount may be set as a value changing depending on at least one of the first and second positions (that is, depending on where at least one of the first and second positions is in a movable range of the stop blades 204a).

Returning to FIG. 2, at step S110, the lens CPU 207 produces the aperture stop driving signal corresponding to the current aperture stop driving direction and the corrected aperture stop driving amount, and applies the aperture stop driving signal to the aperture stop actuator 205. This enables the stop blades 204a to move to the aperture stop position accurately corresponding to the target aperture stop driving amount, which makes it possible to obtain high aperture value accuracy even though there are the reversal backlash of the opening/closing mechanism 204b, the cogging torque of the aperture stop actuator 205 and the sliding resistance between the stop blades 204a.

Next at step S111, the camera CPU 111 determines whether or not the video capturing stop signal has been output from the video capturing switch 115. If the video capturing stop signal has not been output, the camera CPU 111 returns to step S104 to continue the video capturing, and if the video capturing stop signal has been output, the camera CPU 111 ends the video capturing (that is, the camera CPU 111 causes the quick return mirror 101 to perform the down operation and causes the shutter to shut), and then returns to step S002.

On the other hand, the camera CPU 111, which has determined that the current image capturing mode is the still image capturing mode at step S002, determines whether or not the SW1 signal has been output from the release switch 113 at step S203. If the SW1 signal has been output, the camera CPU 111 proceeds to step S204.

At step S204, the camera CPU 111 performs the focus detection on the basis of the focus information from the focus detection unit 104, and decides the focus driving direction and the target focus driving amount. Moreover, the camera CPU 111 calculates the target aperture value on the basis of the photometry information from the photometry unit 110. Then, the camera CPU 111 sends information on the decided focus driving direction, target focus driving amount and target aperture value to the lens CPU 207.

Next at steps S205 to S207, the lens CPU 207 performs processes same as those at steps S105 to S107.

Subsequently at step S208, the lens CPU 207 determines whether or not the SW2 signal has been output from the release switch 113. If the SW2 signal has not been output, the lens CPU 207 returns to step S203, and if the SW2 signal has been output, the lens CPU 207 proceeds to step S209.

At step S209, the lens CPU 207 calculates a target aperture stop driving amount (pulse number) that is a driving amount of the aperture stop actuator 205 necessary to move the stop blades 204a by a driving amount corresponding to a difference between the target aperture value and the current aperture value. Then, the lens CPU 207 calculates the corrected aperture stop driving amount that is a sum of the aperture stop driving correction amount stored in the memory 208 and the target aperture stop driving amount. However, in the still image capturing, the aperture stop unit 204 is always driven from a fully opened state toward the closing direction, so that the aperture stop driving correction amount herein is fixed (constant) regardless of the aperture stop position and the aperture stop driving direction.

Next at step S210, the lens CPU 207 produces the aperture stop driving signal corresponding to the current aperture stop driving direction and the corrected aperture stop driving amount, and applies the aperture stop driving signal to the aperture stop actuator 205. This enables the stop blades 204a to accurately move to the aperture stop position corresponding to the target aperture stop driving amount.

Then at steps S211 and S212, the camera CPU 111 causes the quick return mirror 101 to perform the up operation and causes the shutter to open and close, and further causes the image sensor 102 and the image processor to perform photoelectric conversion and production and recording of a still image.

As described above, this embodiment can keep smooth movement of the stop blades 204a even though the sliding resistance caused due to the overlap of the stop blades 204a and due to the warpage of each stop blade 204a is varied depending on the aperture stop position (aperture value) and the aperture stop driving direction. Therefore, this embodiment can provide high aperture value accuracy in the video capturing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-138620, filed Jun. 17, 2010 which is hereby incorporated by reference herein in its entirety.

What is claimed is:

1. An optical apparatus comprising:
   Plural stop blades;
   an opening/closing mechanism configured to move the stop blades in opening and closing directions;
   an actuator configured to drive the opening/closing mechanism; and
   a controller configured to control drive of the actuator,
   wherein the controller is configured to calculate, when moving the stop blades from a first position to a second position in video capturing, a control driving amount of the actuator that is a sum of (a) a target driving amount corresponding to a moving amount of the stop blades from the first position to the second position and (b) a driving correction amount that varies depending on a position and a moving direction of the stop blades, the position being at least one of the first and second positions, and wherein the controller is configured to control the drive of the actuator based on the control driving amount.

2. An optical apparatus according to claim 1, wherein the controller is configured to calculate the control driving amount and control the drive of the actuator based on the control driving amount when the moving direction in which the stop blades is to be moved from the first position to the second position is reverse to the moving direction of a previous movement of the stop blades to the first position.

3. An optical apparatus according to claim 1, wherein the driving correction amount for a case where the stop blades are moved in the opening direction is larger than that for a case where the stop blades are moved in the closing direction.

4. An optical apparatus according to claim 1, wherein the driving correction amount is increased as an aperture value set by the stop blades becomes higher.

* * * * *